(12) United States Patent
Jiang et al.

(10) Patent No.: US 8,758,635 B2
(45) Date of Patent: Jun. 24, 2014

(54) METHOD FOR MAKING THERMOACOUSTIC ELEMENT

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 24 days.

(21) Appl. No.: 13/303,332

(22) Filed: Nov. 23, 2011

(65) Prior Publication Data
US 2012/0298623 A1 Nov. 29, 2012

(30) Foreign Application Priority Data

May 27, 2011 (CN) .......................... 2011 1 0140260

(51) Int. Cl.
| | |
|---|---|
| *C03C 15/00* | (2006.01) |
| *C03C 25/68* | (2006.01) |
| *H04R 23/00* | (2006.01) |
| *B82Y 30/00* | (2011.01) |
| *C23F 1/02* | (2006.01) |
| *B82Y 10/00* | (2011.01) |
| *B29C 65/18* | (2006.01) |

(52) U.S. Cl.
CPC .............. *H04R 23/002* (2013.01); *B82Y 30/00* (2013.01); *C23F 1/02* (2013.01); *B82Y 10/00* (2013.01); *B29C 65/18* (2013.01)
USPC ................ 216/33; 216/56; 156/253; 156/247

(58) Field of Classification Search
CPC ...... B82Y 30/00; B82Y 10/00; H04R 23/002; C23F 1/02; B32B 38/10; B29C 65/18
USPC ............ 720/718; 530/391.1; 445/24; 438/98, 438/694, 597, 53, 409, 261, 20, 19; 429/401, 231.8, 207; 428/701, 688, 428/408, 403, 366, 34.1, 336, 293.7, 156, 428/138, 119; 427/554, 331, 256; 423/448, 423/447.3; 422/90; 381/164; 361/502; 345/75.2, 179; 324/756.03, 754.07, 324/754.03, 693; 313/495; 257/9, 88, 777, 257/659, 416, 40, 330; 252/500; 250/440.11, 326, 311, 201.3; 228/101; 216/36, 33, 20, 13; 174/254; 156/296, 156/250, 155; 136/256

See application file for complete search history.

(56) References Cited

U.S. PATENT DOCUMENTS 6,753,130 B1 * 6/2004 Liu et al. .................... 430/313
2005/0271574 A1 12/2005 Jang et al.

(Continued)

FOREIGN PATENT DOCUMENTS

| CN | 101239712 | 8/2008 |
|---|---|---|
| CN | 101442105 | 5/2009 |

(Continued)

OTHER PUBLICATIONS

Tung et al. Low-Temperature Solution processing of Graphene-Carbon Nanotube Hybrid Materials for High-Performance Transparent Conductors, Nano Letters, vol. 9, No. 5, 2009, pp. 1949-195.*

(Continued)

*Primary Examiner* — Duy Deo
*Assistant Examiner* — Erin Bergner
(74) *Attorney, Agent, or Firm* — Novak Druce Connolly Bove + Quigg LLP

(57) ABSTRACT

The present disclosure relates to a method for making a thermoacoustic element. In the method, a graphene film is arranged on a metal substrate. A nonmetal substrate is stacked with the graphene film located on the metal substrate to form a laminate structure. The graphene film is sandwiched between the nonmetal substrate and the metal substrate. The metal substrate is removed from the stacked structure. A number of through-holes are formed in the nonmetal substrate. The graphene film is exposed through the plurality of through-holes.

20 Claims, 13 Drawing Sheets

(56) References Cited

U.S. PATENT DOCUMENTS

| | | |
|---|---|---|
| 2008/0248235 A1 | 10/2008 | Feng et al. |
| 2009/0017596 A1* | 1/2009 | Hanson et al. ............. 438/431 |
| 2009/0056854 A1* | 3/2009 | Oh et al. ............. 156/60 |
| 2009/0268556 A1* | 10/2009 | Jiang et al. ............. 367/140 |
| 2009/0291270 A1* | 11/2009 | Zettl et al. ............. 428/195.1 |
| 2010/0021708 A1* | 1/2010 | Kong et al. ............. 428/220 |
| 2011/0017921 A1 | 1/2011 | Jiang et al. |
| 2011/0123776 A1 | 5/2011 | Shin et al. |
| 2012/0021224 A1* | 1/2012 | Everett et al. ............. 428/408 |
| 2012/0192931 A1 | 8/2012 | Jeon et al. |
| 2012/0251764 A1 | 10/2012 | Jiang et al. |

FOREIGN PATENT DOCUMENTS

| | | |
|---|---|---|
| CN | 101734650 | 6/2010 |
| CN | 101760724 | 6/2010 |
| CN | 102717537 | 10/2012 |
| JP | 2009-91174 | 4/2009 |
| JP | 2010-52972 | 3/2010 |
| TW | 200833862 | 8/2008 |
| TW | 201103862 | 2/2011 |
| WO | WO2011016616 | 2/2011 |

OTHER PUBLICATIONS

Xiaochen Dong et al.; "One-step growth of graphene-carbon nanotube hybrid materials by chemical vapor deposition"; Carbon, vol. 49, p. 2944-2949, Mar. 6, 2011.

Dingshan Yu et al.; "Self-Assembled Graphene/Carbon Nanotube Hybrid Films for Supercapacitors" The Journal of Physical Chemistry Letters, vol. 1(2010), p. 467-470, Dec. 22, 2009.

* cited by examiner

METHOD FOR MAKING THERMOACOUSTIC ELEMENT

CROSS-REFERENCE TO RELATED APPLICATIONS

This application claims all benefits accruing under 35 U.S.C. §119 from China Patent Application No. 201110140260.5, filed on May 27, 2011, in the China Intellectual Property Office, the contents of which are hereby incorporated by reference.

BACKGROUND

1. Technical Field

The present disclosure relates to a method for making thermoacoustic elements.

2. Description of Related Art

Acoustic devices generally include a signal device and a sound wave generator. The signal device inputs signals to the sound wave generator such as a loudspeaker. Thermoacoustic effect is a conversion between heat and acoustic signals. The thermoacoustic effect is distinct from the mechanism of the conventional loudspeaker, which makes sounds by using the pressure waves created by the mechanical movement of the diaphragm. When signals are inputted into a thermoacoustic element, heat is produced in the thermoacoustic element according to the variations of the signal and/or signal strength. The produced heat is propagated into surrounding medium. The heating of the surrounding medium causes thermal expansion of the surrounding medium, thus producing pressure waves in the surrounding medium, and resulting in sound wave generation. Such an acoustic effect induced by temperature changes is commonly called the "thermoacoustic effect".

A thermophone based on the thermoacoustic effect was created by H. D. Arnold and I. B. Crandall (H. D. Arnold and I. B. Crandall, "The thermophone as a precision source of sound", Phys. Rev. 10, pp 22-38 (1917)). They used platinum strip with a thickness of $7 \times 10^{-5}$ cm as a thermoacoustic element. The heat capacity per unit area of the platinum strip with the thickness of $7 \times 10^{-5}$ cm is $2 \times 10^{-4}$ J/cm²·K. However, the sound made by the thermophone adopting the platinum strip is extremely weak because the heat capacity per unit area of the platinum strip is too high.

Graphene is a carbonaceous material composed of carbon atoms densely packed in a two dimensional honeycomb crystal lattice. The graphene has excellent electrical and thermal properties. An electron mobility of the graphene at room temperature is greater than 15000 cm²V⁻¹s⁻¹. A thermal conductivity of the graphene is greater than 3000 Wm⁻¹K⁻¹. The graphene has been applied in different fields such as field emission or sensor. However, the graphene is rarely applied in the thermoacoustic element.

What is needed, therefore, is to provide a method for making a graphene based thermoacoustic element having an improved sound intensity.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
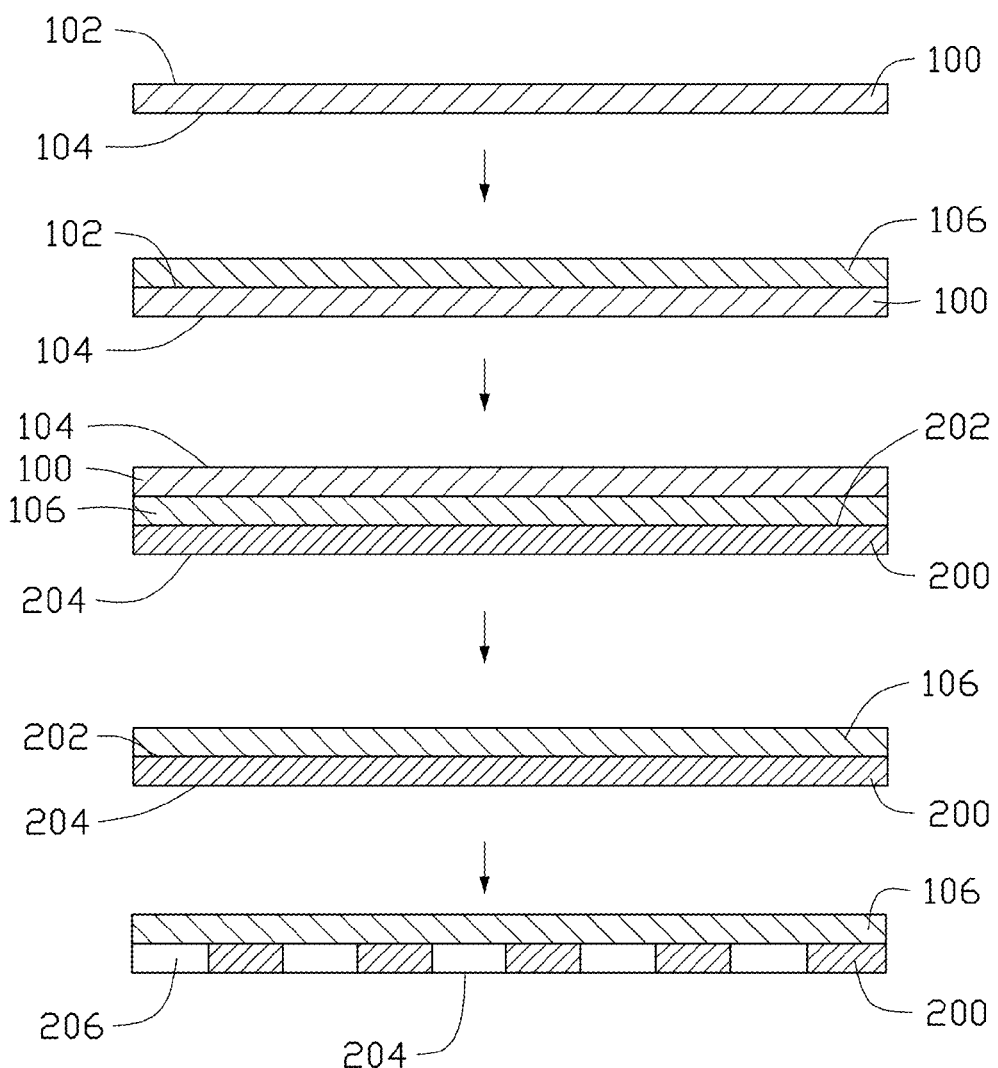
FIG. 1 shows a flowchart of one embodiment of a method for making a thermoacoustic element at various stages.

Referring to FIG. 1, one embodiment of a method for making a thermoacoustic element includes:

S1, arranging a graphene film 106 on a metal substrate 100;

S2, forming a laminate structure by stacking a nonmetal substrate 200 on the metal substrate 100, wherein the graphene film 106 is sandwiched between the nonmetal substrate 200 and the metal substrate 100;

S3, removing the metal substrate 100 from the laminate structure; and

S4, forming a plurality of through-holes 206 in the nonmetal substrate 200, wherein the graphene film 106 is exposed through the plurality of through-holes 206.

In step S1, the metal substrate 100 has a first surface 102 and a second surface 104 opposite to the first surface 102. A shape of the metal substrate 100 is not limited. The first surface 102 of the metal substrate 100 can be a planar or curved surface. The graphene film 106 is located on the first surface 102 of the metal substrate 100. A size (e.g. area) of the metal substrate 100 is not limited and can be set as desired. A thickness of the metal substrate 100 can be in a range from about 100 nanometers (nm) to about 100 micrometers (μm). The metal material can be copper or nickel. In one embodiment, the metal substrate 100 is copper sheet having the thickness of about 25 μm.

The graphene film 106 can be arranged on the metal substrate 100 by chemical vapor deposition (CVD), mechanical pressure method, Langmuir-Blodgett (LB) method, solution method, or tearing from oriented graphite using a tape.

In one embodiment, the graphene film 106 is directly grown on the metal substrate 100 by the CVD method. The CVD method includes:

S11, disposing the metal substrate 100 in a reacting chamber;

S12, heating the metal substrate 100 to a predetermined temperature;

S13, supplying a carbon source gas into the reacting chamber, thereby forming the graphene film 106 on the first surface 102 of the metal substrate 100.

In step S11, the reacting chamber can provide a reaction space for forming the graphene film 106. The reacting chamber can have a sealed cavity. The reacting chamber includes a gas inlet and a gas outlet. The gas inlet is used to input a reaction gas. The gas outlet is connected with an evacuating device. The evacuating device can be used to adjust vacuum degree or atmospheric pressure in the reacting chamber. Furthermore, the reacting chamber can include a water cooling device used to adjust the temperature in the reacting chamber. The reacting chamber can be a quartz tube furnace. An area of the metal substrate 100 can be adjusted according to the volume of space in the reacting chamber. The metal substrate 100 having a relatively large area can be bent or curved to be put in the reacting chamber.

In step S12, the first surface 102 of the metal substrate 100 is heated to become more flat. The flatter the first surface 102, the easier to form the graphene film 106 on the first surface 102 of the metal substrate 100. The reacting chamber is evacuated before heating the metal substrate 100. In one embodiment, hydrogen gas can be imported in the reacting chamber through the gas inlet before heating the metal substrate 100. The hydrogen gas can reduce an oxide layer on the first surface 102 of the metal substrate 100, and can further prevent the metal substrate 100 from being oxidized. A flow rate of the hydrogen gas can be in a range from about 2 standard cubic centimeters per minute (sccm) to about 35 sccm. The heating temperature can be in a range from about 800° C. to about 1500° C. The heating period can be in a range from about 20 minutes to about 60 minutes. An atmospheric pressure in the reacting chamber can be in a range from about $10^{-1}$ Pa to about $10^2$ Pa. In one embodiment, the flow rate of the hydrogen gas is about 2 sccm, the atmospheric pressure of the reacting chamber is about 13.3 Pa, the heating temperature is about 1000° C., a temperature rising period is about 40 minutes, and a constant temperature period at the heating temperature is about 20 minutes.

In step S13, carbon atoms can be deposited on the first surface 102 of the metal substrate 100, thereby forming the graphene film 106 composed of the carbon atoms. The hydrogen gas is continuously imported through the gas inlet. The flow rate of the hydrogen gas, while the carbon source gas is supplied into the reacting chamber, is the same as that of the step S12. The carbon source gas can be at least one of methane, ethane, ethylene, or acetylene. While supplying the carbon source gas, the temperature in the reacting chamber can be in a range from about 800° C. to about 1500° C., and the constant temperature period can be in a range from about 10 minutes to about 60 minutes. The atmospheric pressure in the reacting chamber can be in a range from about $10^{-1}$ Pa to about $10^2$ Pa. In one embodiment, the atmospheric pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

Furthermore, the metal substrate 100 can be cooled after forming the graphene film 106 thereon. During the cooling of the metal substrate 100, the carbon source gas and the hydrogen gas can continuously flow into the reacting chamber. The flow rate of the carbon source gas and the hydrogen gas and the atmospheric pressure of the reacting chamber are constant in the heating step. In one embodiment, the metal substrate 100 is cooled for about 1 hour. After cooling the metal substrate 100, the metal substrate 100 with graphene film 106 grown thereon is taken out of the reacting chamber.

Figure 2:
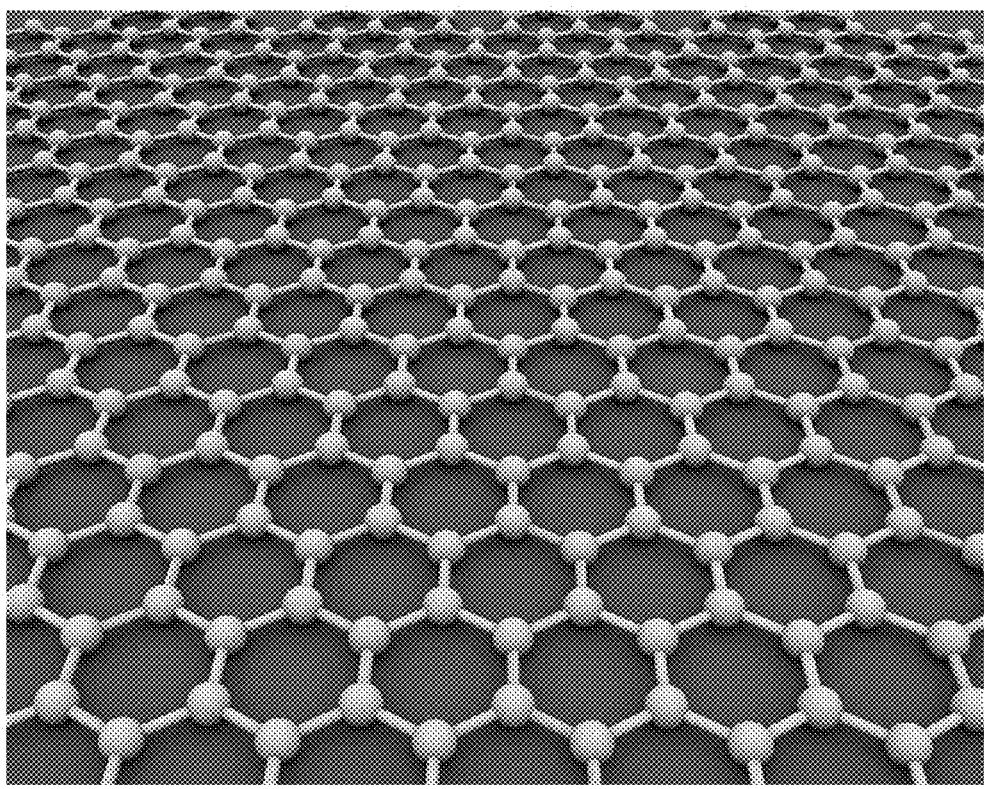
FIG. 2 is a structural schematic view of a graphene film used in the method of FIG. 1.

Referring to FIG. 2, the graphene is a one-atom thick sheet composed of a plurality of $sp^2$-bonded carbon atoms. The graphene is a stable free standing structure. The term "freestanding structure" means that the graphene film 106 can sustain the weight of itself when it is hoisted by a portion thereof without any significant damage to its structural integrity. So, if the graphene film 106 is placed between two separate supports, a portion of the graphene film 106, not in contact with the two supports, would be suspended between the two supports and still maintains its structural integrity. An area of the graphene film 106 can be larger than 1 square centimeter ($cm^2$). In one embodiment, the graphene film 106 is larger than 2 $cm^2$ and less than or equal to 100 $cm^2$. The graphene film 106 having one graphene layer has a high transmittance of 97.7%. A heat capacity of the graphene film 106 can be less than $2 \times 10^{-3}$ J/$cm^2 \cdot$K. In one embodiment, the graphene film 106 having one graphene layer is less than $2 \times 10^{-7}$ J/$cm^2 \cdot$K, the area of the graphene film 106 is 16 $cm^2$, the shape of the graphene film 106 is square.

In step S2, the shape, size, and thickness of the nonmetal substrate 200 are not limited. The nonmetal substrate 200 has a first surface 202 and a second surface 204 opposite to the first surface 202. The first surface 202 is in contact with the graphene film 106. The first surface 202 or the second surface 204 can be a planar surface or a curved surface. An area of the nonmetal substrate 200 is not limited and can be adjusted as desired. A material of the nonmetal substrate 200 is not limited and can be a rigid material or a flexible material. Specifically, the material of the nonmetal substrate 200 can be glass, ceramics, quartz, diamond, plastic, or resin. In one embodiment, the nonmetal substrate 200 is a silicon sheet. The silicon sheet is square-shaped with a side length of about 4 cm. A thickness of the nonmetal substrate 200 can be in a range from about 12.5 μm to about 50 μm. In one embodiment, the thickness of the nonmetal substrate 200 is 25 μm.

The laminate structure can be fixed together by method (1), method (2), or method (3) as described below.

In the method (1), a macromolecule material layer is formed between the graphene film 106 and the nonmetal substrate 200. The method (1) includes:

S21, disposing a macromolecule solution or a molten macromolecule between the graphene film 106 and the nonmetal substrate 200; and S22, solidifying the macromolecule solution or the molten macromolecule to form a macromolecule material layer, the graphene film 106 and the nonmetal substrate 200 being fixed together by the macromolecule material layer.

In step S21, the macromolecule solution or the molten macromolecule can be uniformly coated on the first surface 202 of the nonmetal substrate 200, or the nonmetal substrate 200 can be immersed in the macromolecule solution. The macromolecule solution is formed by dissolving a macromolecule material into a volatile organic solvent. The organic solvent can be ethanol, methanol, acetone, dichloroethane, chloroform, or any combination thereof. The molten macromolecule is formed by heating the macromolecule material to a molten temperature of the macromolecule material. The macromolecule material can be transparent. The macromolecule material can be phenolic resin (PF), polystyrene (PS), ethoxyline resin (EP), polyurethane (PU), polymethyl methacrylate (PMMA), polycarbonate (PC), polyethylene terephthalate (PET), or polyalkenamer. The macromolecule solution or the molten macromolecule can have a viscosity larger than 1 Pa·s.

In step S22, during solidifying the macromolecule solution or the molten macromolecule, the laminate structure can be further pressed by a force, whereby the nonmetal substrate 200 and the graphene film 106 can be closely combined with the macromolecule solution or the molten macromolecule. A thickness of the macromolecule material layer can be in a range from about 0.1 μm to about 1 mm.

Figure 3:
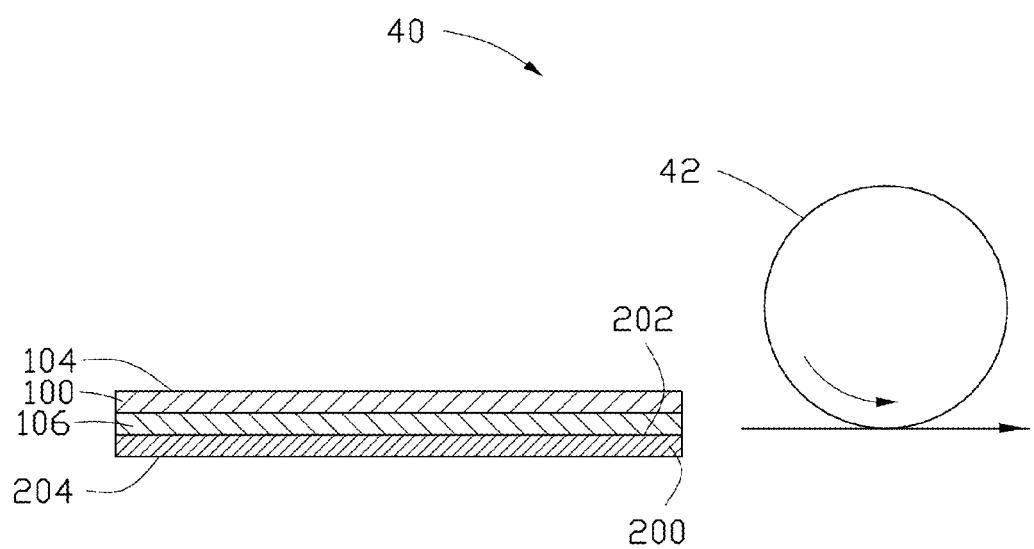
FIG. 3 is a structural schematic view of a hot-press process used in the method of FIG. 1.

In the method (2), the laminate structure can be combined to form an integrative structure by hot pressing technology or cold pressing technology. In one embodiment, referring to FIG. 3, hot pressing technology is used. A hot pressing device 40 in the hot pressing technology can include a pressing element and a heating element. In one embodiment, the pressing element is a metal roll 42.

The hot pressing process includes:

S21', disposing the laminate structure in a hot pressing device 40;

S22', heating a metal roll 42 using the heating element of the hot pressing device 40, wherein the heating temperature can be in a range from about 110° C. to about 120° C.

S23', hot pressing the laminate structure using the heated metal roll 42.

In step S23', the heated metal roll 42 can continuously roll on the laminate structure, thereby applying a pressure on the laminate structure. A rolling speed of the metal roll 42 can be in a range from about 1 millimeter per minute to about 10 meters per minute. In addition, the graphene film 106 can soften while pressing the laminate structure from the heat of the metal roll 42, and the air between the graphene film 106 and the nonmetal substrate 200 can be expelled. Thus, the nonmetal substrate 200 and the graphene film 106 can be closely pressed together. In one embodiment, the pressure applied by the metal roll 42 is in a range from about 49 Pa to about 196 Pa. In addition, the graphene film 106 is not easily destroyed, because the graphene film 106 is disposed between the nonmetal substrate 200 and the metal substrate 100, and the graphene film 106 does not directly contact the metal roll 42.

In the method (3), an organic solvent is used to closely combine the laminate structure. The method (3) includes:

S21", infiltrating the organic solvent into the laminate structure;

S22", removing the organic solvent to closely combine the nonmetal substrate 200 and the graphene film 106 together.

In step S21", drops of the organic solvent can be dropped into the laminate structure using a dropper, or the laminate structure can be immersed into a container having the organic solvent. The organic solvent can be a volatile organic solvent. The organic solvent can be ethanol, methanol, acetone, dichloroethane, chloroform, or any combination thereof. In one embodiment, the organic solvent is ethanol.

In step S22', after the organic solvent has infiltrated into the laminate structure, the nonmetal substrate 200 and the graphene film 106 closely combine together due to the surface tension of the organic solvent as the organic solvent volatilizes.

In step S3, the metal substrate 100 can be removed by a dry etching technology or a wet etching technology. In one embodiment, the metal substrate 100 is a copper substrate removed by wet etching technology. Before removing the copper substrate using the wet etching technology, the copper substrate can be completely oxidized using oxygen plasma to form a copper oxide substrate. In one embodiment, the graphene film 106 located on the copper oxide substrate and the nonmetal substrate 200 are immersed into a ferric nitrate solution, thereby introducing a reaction between the copper oxide substrate and the ferric nitrate solution, after which, the copper oxide substrate is completely removed due to the reaction. In one embodiment, a concentration of the ferric nitrate solution is in a range from about 0.06 mol/L to about 0.25 mol/L, an immersion period is in a range from about 4 minutes to about 15 minutes.

The graphene film 106 and the nonmetal substrate 200 stacked on the graphene film 106 can be taken out from the solution. The graphene film 106 can be supported by the nonmetal substrate 200, thus, the graphene film 106 does not break easily when being lifted from the solution. Subsequently, the graphene film 106 and the nonmetal substrate 200 can be repeatedly washed by deionized water. In one embodiment, the graphene film 106 and the nonmetal substrate 200 can be washed by deionized water for about 15 minutes, and a volume of the deionized water is about 300 mL.

In step S4, the nonmetal substrate 200 is etched to form the plurality of through-holes 206. A depth of the through-holes 206 is equal to the thickness of the nonmetal substrate 200. A cross-sectional shape of the through holes 206 is not limited and can be round or polygonal, such as rectangular or triangular, and any other desired shape. The through-holes 206 can be irregularly distributed or regularly distributed. A distance between the adjacent through-holes 206 is not limited and can be in a range from about 100 μm to about 3 mm. In one embodiment, the shape of the through-holes 206 is cylindrical shaped, and the through-holes 206 are uniformly distributed in the nonmetal substrate 200. The step S4 can be processed before or after step S2. In addition, the plurality of through-holes 206 can be formed in the nonmetal substrate 200 before step S2.

Furthermore, at least two electrodes are formed on a surface of the graphene film 106. The at least two electrodes are spaced from each other, and electrically connected with the graphene film 106. A material of the electrodes can be metal, carbon nanotubes, or conductive silver paste. In one embodiment, the material of the electrodes is conductive silver paste. The conductive silver paste can be formed on the surface of the graphene film 106 by screen printing, transfer printing, coating, or spraying. In one embodiment, the conductive silver paste is coated on the surface of the graphene film 106. Furthermore, the conductive silver paste can be solidified by heating. The heating period can be in a range from about 10 minutes to about 60 minutes. The heating temperature can be in a range from about 100° C. to about 120° C.

Figure 4:
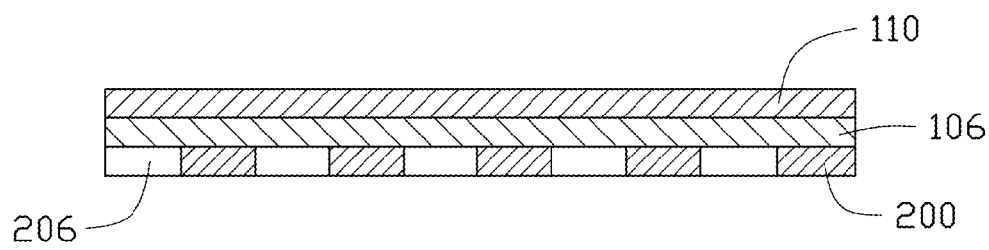
FIG. 4 is a structural schematic view of one embodiment of a thermoacoustic element made by the method of FIG. 1.
Figure 5:
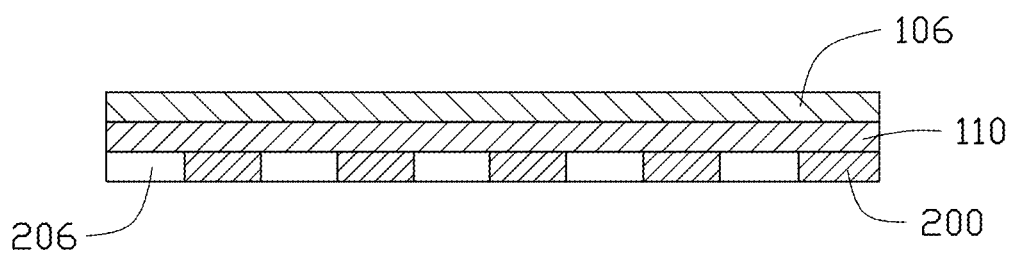
FIG. 5 is a structural schematic view of another embodiment of a thermoacoustic element made by the method of FIG. 1.

Furthermore, a step of combining a carbon nanotube layer 110 with the graphene film 106 can be provided before or after step S1. Referring to FIG. 4, if the carbon nanotube layer 110 is combined with the graphene film 106 after step S1, the graphene film 106 is sandwiched between the nonmetal substrate 200 and carbon nanotube layer 110. Referring to FIG. 5, if the carbon nanotube layer 110 is combined with the graphene film 106 before step S1, the carbon nanotube layer 110 can be sandwiched between the nonmetal substrate 200 and the graphene film 106, accordingly, the carbon nanotube layer 110 can be exposed through the through-holes of the nonmetal substrate 200 in step S4. In addition, the carbon nanotube layer 110 can also be combined with the graphene film 106 before or after step S4. The way of combining the carbon nanotube layer 110 and the graphene film 106 is not limited, for example, the carbon nanotube layer 110 can be directly stacked on the graphene film 106.

The carbon nanotube layer 110 can be a carbon nanotube film structure. The carbon nanotube film structure includes a plurality of carbon nanotubes. The plurality of carbon nanotubes are uniformly distributed in the carbon nanotube layer 110. The carbon nanotubes can be single-walled, double-walled, or multi-walled carbon nanotubes. The carbon nanotubes are combined by van der Waals attractive force therebetween. The carbon nanotube film structure can be a free-standing structure. The carbon nanotubes in the carbon nanotube film structure can be orderly or disorderly arranged. The term 'disordered carbon nanotube film structure' includes a film structure wherein the carbon nanotubes are arranged along many different directions, such that the number of carbon nanotubes arranged along each different direction can be almost the same (e.g. uniformly disordered) and/or entangled with each other. 'Ordered carbon nanotube film structure' is a structure wherein the carbon nanotubes are arranged in a consistently systematic manner, e.g., the carbon nanotubes are arranged approximately along a same direction or have two or more sections within each of which the carbon nanotubes are arranged approximately along a same direction (different sections can have different directions). A thickness of the carbon nanotube film structure is not limited, and can be in a range from about 0.5 nm to about 1 cm. In one embodiment, the thickness of the carbon nanotube film structure is in a range from about 100 μm to about 0.5 mm. The carbon nanotube film structure can have a plurality of micropores defined by the plurality of carbon nanotubes. A diameter of the micropore can be less than or equal to 50 μm. A heat capacity per unit area of the carbon nanotube film structure can be less than $2 \times 10^{-4}$ J/cm$^2$·K. In one embodiment, the heat capacity per unit area of the carbon nanotube film structure is less than or equal to $1.7 \times 10^{-6}$ J/cm$^2$·K. The carbon nanotube film structure can include at least one drawn carbon nanotube film, flocculated carbon nanotube film, pressed carbon nanotube film, or any combination thereof.

Figure 6:
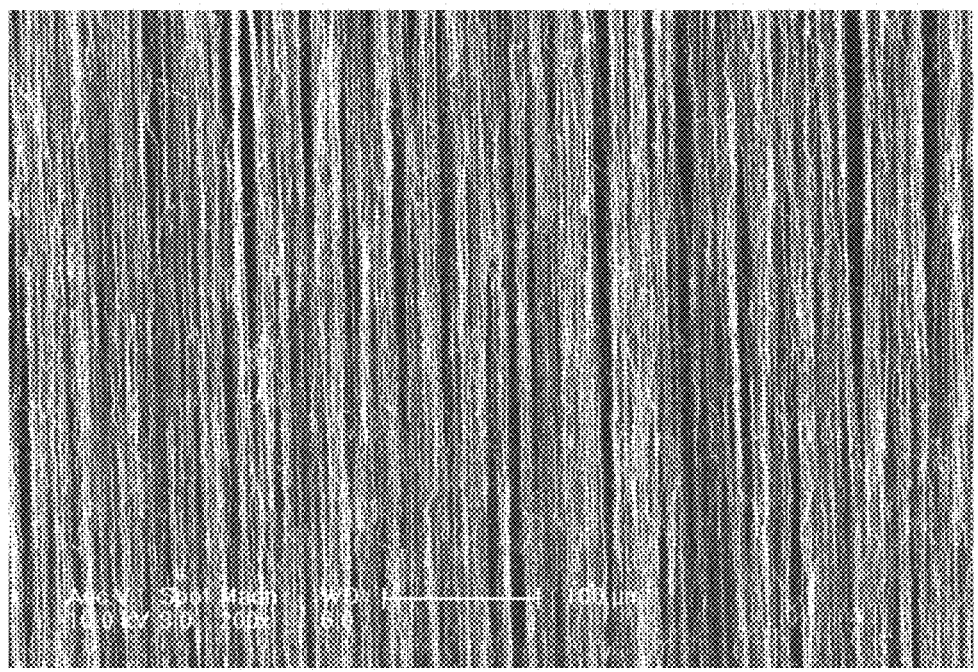
FIG. 6 is a Scanning Electron Microscopic (SEM) image of a drawn carbon nanotube film used in the method of FIG. 1.

Referring to FIG. 6, the drawn carbon nanotube film includes a plurality of successive and oriented carbon nanotubes joined end-to-end by van der Waals attractive force therebetween. The carbon nanotubes in the drawn carbon nanotube film can be substantially aligned in a single direction and substantially parallel to a surface of the drawn carbon nanotube film. The drawn carbon nanotube film can be formed by drawing a film from a carbon nanotube array that is capable of having a film drawn therefrom. A large number of the carbon nanotubes in the drawn carbon nanotube film can be oriented along a preferred orientation, meaning that a large number of the carbon nanotubes in the drawn carbon nanotube film are arranged substantially along the same direction. A small number of the carbon nanotubes are randomly arranged in the drawn carbon nanotube film, and has a small if not negligible effect on the larger number of the carbon nanotubes in the drawn carbon nanotube film arranged substantially along the same direction. A thickness of the drawn carbon nanotube film can be in a range from about 0.5 nm to about 100 μm. Examples of a drawn carbon nanotube film is taught by U.S. Pat. No. 7,045,108 to Jiang et al., and WO 2007015710 to Zhang et al.

The carbon nanotube film structure can include a plurality of drawn carbon nanotube films stacked with each other. An angle between adjacent carbon nanotube films is not limited.

Figure 7:
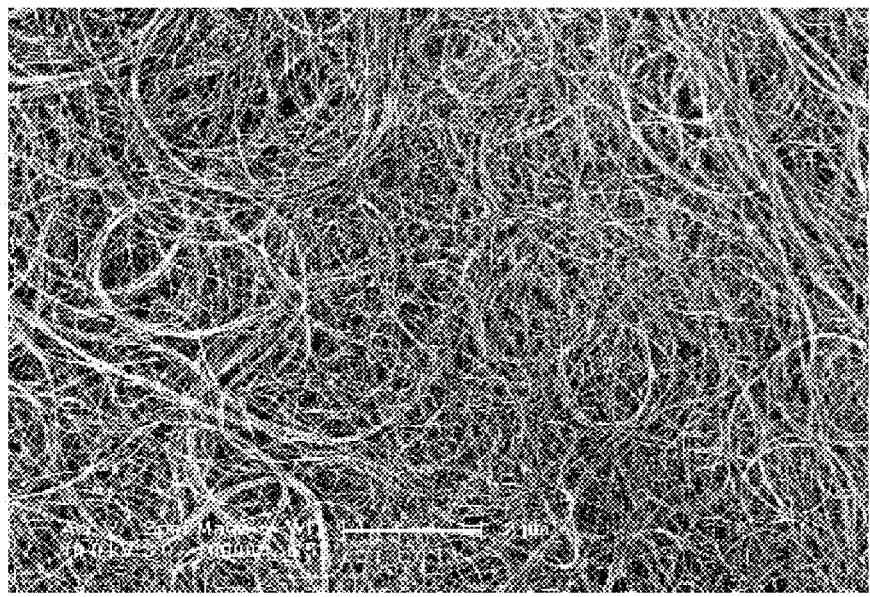
FIG. 7 is an SEM image of a flocculated carbon nanotube film used in the method of FIG. 1.

Referring to FIG. 7, the flocculated carbon nanotube film can include a plurality of long, curved, disordered carbon nanotubes entangled with each other. A length of the carbon nanotubes can be larger than 10 cm. Furthermore, the flocculated carbon nanotube film can be isotropic. The carbon nanotubes can be substantially uniformly distributed in the flocculated carbon nanotube film. The adjacent carbon nanotubes are combined by the van der Waals attractive force therebetween, thereby forming an entangled structure with micropores defined therein. It is understood that the flocculated carbon nanotube film is very porous. Sizes of the micropores can be less than 10 μm. The porous nature of the flocculated carbon nanotube film will increase the specific surface area of the carbon nanotube film structure. The carbon nanotube film structure employing the flocculated carbon nanotube film has excellent durability, and can be fashioned into desired shapes with a low risk to the integrity of carbon nanotube structure.

Figure 8:
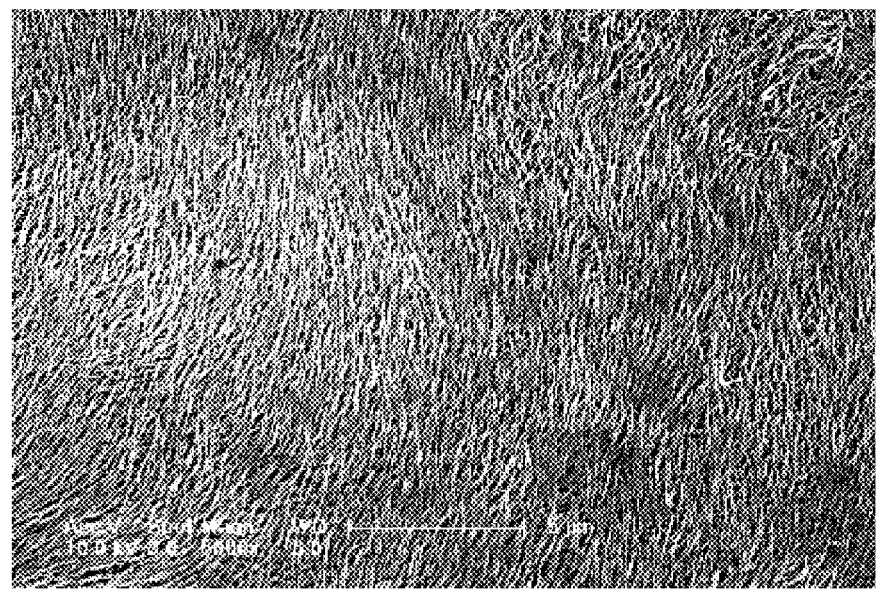
FIG. 8 is an SEM image of a pressed carbon nanotube film used in the method of FIG. 1.

Referring to FIG. 8, the pressed carbon nanotube film includes a plurality of carbon nanotubes uniformly distributed. The pressed carbon nanotube film is formed by pressing a carbon nanotube array having aligned carbon nanotubes combined by van der Waals attractive force therebetween. By pressing, the carbon nanotubes are compressed or laid against the substrate. The carbon nanotubes in the pressed carbon nanotube film are arranged along a same direction or arranged along different directions. The carbon nanotubes in the pressed carbon nanotube film can overlap each other. The adjacent carbon nanotubes are combined and attracted by van der Waals attractive force, thereby forming a free-standing structure that can be separated from the substrate. An angle between a primary alignment direction of the carbon nanotubes and the substrate is in an approximate range from 0 degrees to approximately 15 degrees. The angle between a primary alignment direction of the carbon nanotubes and the substrate is closely related to the pressure applied to the carbon nanotube array. The greater the pressure, the smaller the angle. The carbon nanotubes in the pressed carbon nanotube film can be parallel to the surface of the pressed carbon nanotube film if the angle is 0 degrees. A length and a width of the carbon nanotube film can be arbitrarily set as desired. An example of a pressed carbon nanotube film is taught by U.S. Pat. No. 7,641,885 to Liu et al.

Figure 9:
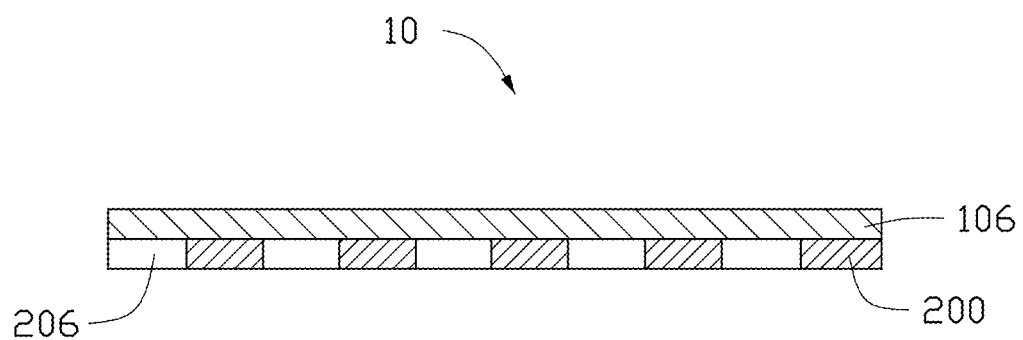
FIG. 9 is a structural schematic view of another embodiment of a thermoacoustic element made by the method of FIG. 1.

Referring to FIG. 9, the thermoacoustic element 10 made by the above method includes the nonmetal substrate 200 and the graphene film 106. The graphene film 106 is disposed on a surface of the nonmetal substrate 200. The nonmetal substrate 200 defines a plurality of through-holes 206. The graphene film 106 can be exposed through the plurality of through-holes 206. In one embodiment, the shape of the plurality of through-holes 206 is cylindrical. The graphene film 106 in the thermoacoustic element 10 has a small heat capacity per unit area and a large heat radiating area. The through-holes 206 can increase a contact area between the graphene film 106 and the surrounding medium, and can decrease a contact area between the graphene film 106 and the nonmetal substrate 200. The nonmetal substrate 200 can adsorb a small amount of heat during heat exchanged between the thermoacoustic element 10 and the surrounding medium. Thus, the thermoacoustic element 10 has a high acoustic efficiency and a good acoustic effect. The thermoacoustic element 10 has no magnet, thus, the structure of the thermoacoustic element 10 is simple, thereby decreasing cost of the thermoacoustic element 10.

In use, the thermoacoustic element 10 can be heated by injecting current, heat radiation, or light radiation. If the thermoacoustic element 10 is heated by injecting current, the material of the nonmetal substrate 200 should be an insulation material.

Figure 10:
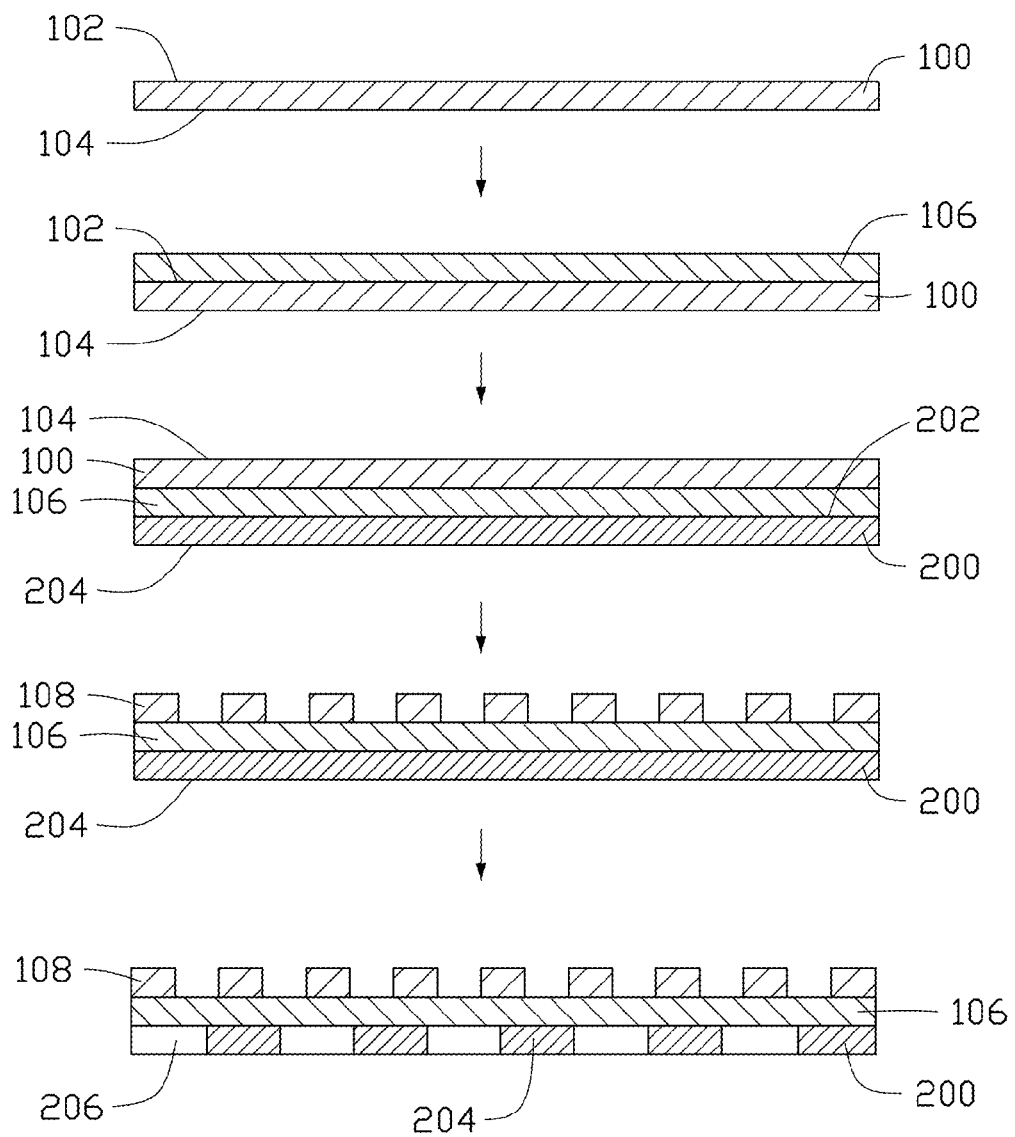
FIG. 10 shows a flowchart of another embodiment of a method for making a thermoacoustic element at various stages.

Referring to FIG. 10, another embodiment of a method for making a thermoacoustic element includes:

S1', arranging the graphene film 106 on the metal substrate 100;

S2', stacking the nonmetal substrate 200 with the graphene film 106 located on the metal substrate 100 to form a laminate structure, wherein the graphene film 106 is sandwiched between the nonmetal substrate 200 and the metal substrate 100;

S3', partially removing the metal substrate 100 from the laminate structure; and S4', forming the plurality of through-holes 206 in the nonmetal substrate 200, wherein the graphene film 106 is exposed through the plurality of through-holes 206.

The step S1', S2', and S4' are the same as the above step S1, S2, and S4. In the step S3', the metal substrate 100 can be partially removed by the dry etching technology or the wet etching technology. In one embodiment, the metal substrate 100 is partially removed by the dry etching technology, thereby forming a plurality of stripped electrodes 108 spaced from each other.

Figure 11:
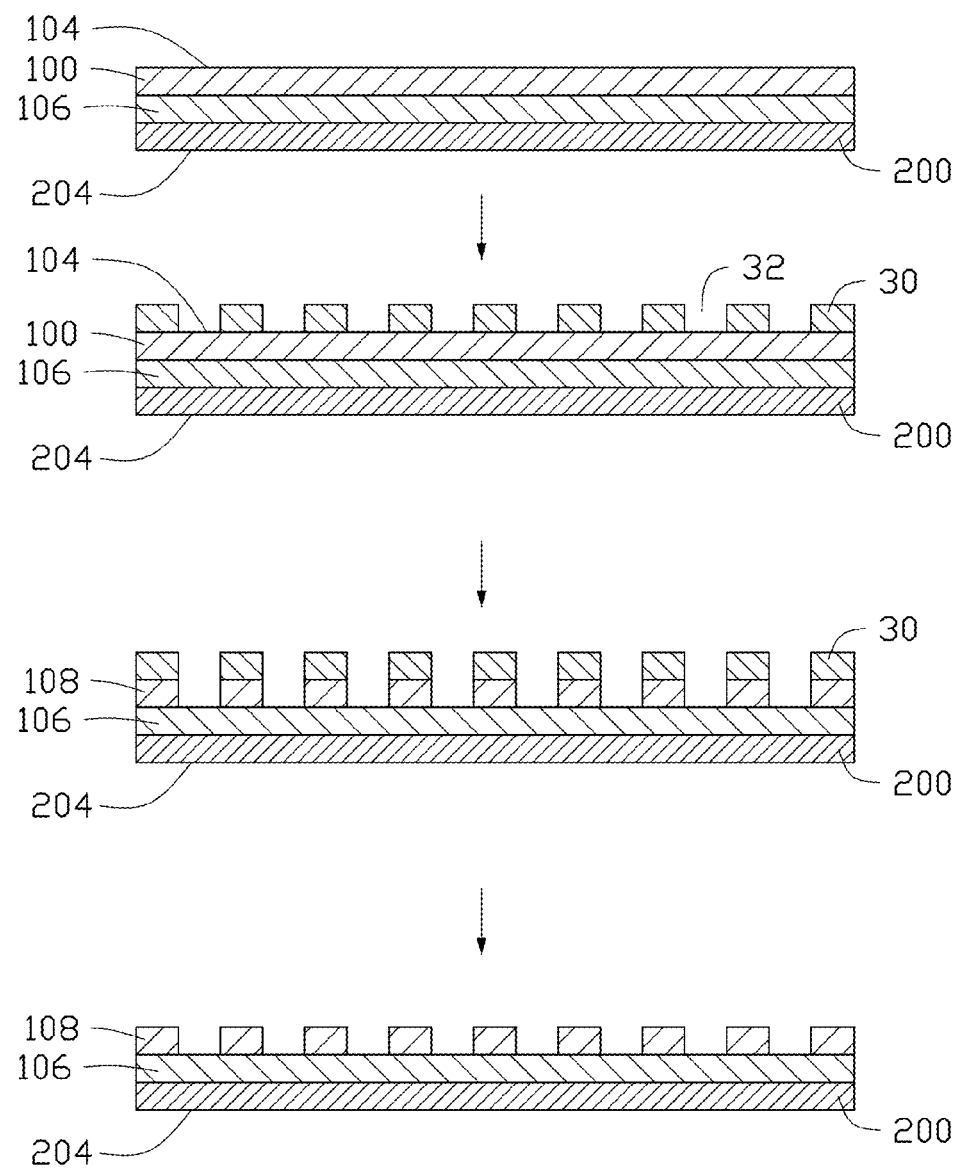
FIG. 11 shows a flowchart of one embodiment of a method for making strip shaped electrodes at various stages.

Referring to FIG. 11, the method for dry etching the metal substrate 100 includes:

S31', applying a sacrifice layer 30 on the second surface 104 of the metal substrate 100, wherein the sacrifice layer 30 consists of a plurality of spaced sacrifice strips 32 to expose the partial metal substrate 100;

S32', etching the partial metal substrate 100 exposed from the sacrifice layer 30, thereby forming the plurality of stripped electrodes 108 spaced from each other and exposing a part of the graphene film 106; and S33', removing the sacrifice layer 30.

In step S31', a material of the sacrifice layer 30 can be a polymer. The polymer can be thermosetting resin, for example, polymethyl methacrylate, ethoxyline resin, unsaturated polyester, or silicon ether resin.

In step S32', the plurality of stripped electrodes 108 are electrically connected with the graphene film 106. The metal substrate 100 can be etched by disposing the metal substrate 100 with the sacrifice layer 30 in an inductive coupling plasma system, and etching the metal substrate 100 exposed from the sacrifice layer 30 using oxygen and chlorine gas, thereby exposing the graphene film 106. In one embodiment, a power of the inductive coupling plasma system is about 50 W, a flow rate of the chlorine gas is about 24 sccm, a flow rate of the oxygen is about 24 sccm, an atmospheric pressure of the inductive coupling plasma system is in a range from about 2 Pa to about 10 Pa, and an etching period is in a range from about 40 seconds to about 55 seconds.

In one embodiment, the metal substrate 100 is etched by the wet etching technology, and the material of the metal substrate 100 is copper. Specifically, the metal substrate 100 is etched by immersing the metal substrate 100 in a Ferric trichloride ($FeCl_3$) solution, wherein a concentration of the $FeCl_3$ solution is in a range from about 0.06 mol/L to about 0.25 mol/L, the immersing period is in a range from about 4 minutes to about 15 minutes. The metal substrate 100 uncoated by the sacrifice layer 30 is removed due to a reaction between the metal substrate 100 and the $FeCl_3$ solution.

In step S33', the sacrifice layer 30 can be removed by an organic solvent. The organic solvent can be ethanol, methanol, acetone, dichloroethane, chloroform, or any combination thereof. In one embodiment, the sacrifice layer 30 is removed by acetone.

Figure 12:
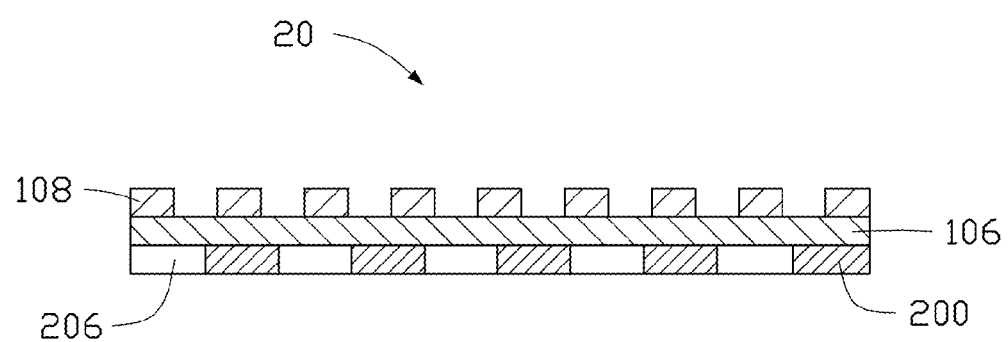
FIG. 12 is structural schematic view of one embodiment of a thermoacoustic element made by the method of FIG. 10.

Referring to FIG. 12, a thermoacoustic element 20 made by the above method includes a nonmetal substrate 200, a graphene film 106, and the plurality of stripped electrodes 108. The graphene film 106 is disposed on the nonmetal substrate 200. The plurality of stripped electrodes 108 can be substantially parallel to each other and electrically connected with the graphene film 106. The graphene film 106 is sandwiched between the nonmetal substrate 200 and the plurality of stripped electrodes 108, and respectively contacts the nonmetal substrate 200 and the plurality of stripped electrodes 108. The nonmetal substrate 200 defines the plurality of through-holes 206. In one embodiment, the shape of the through-holes 206 is cylindrical shaped. The stripped electrodes 108 can support the graphene film 106, thereby protecting the graphene film 106.

Figure 13:
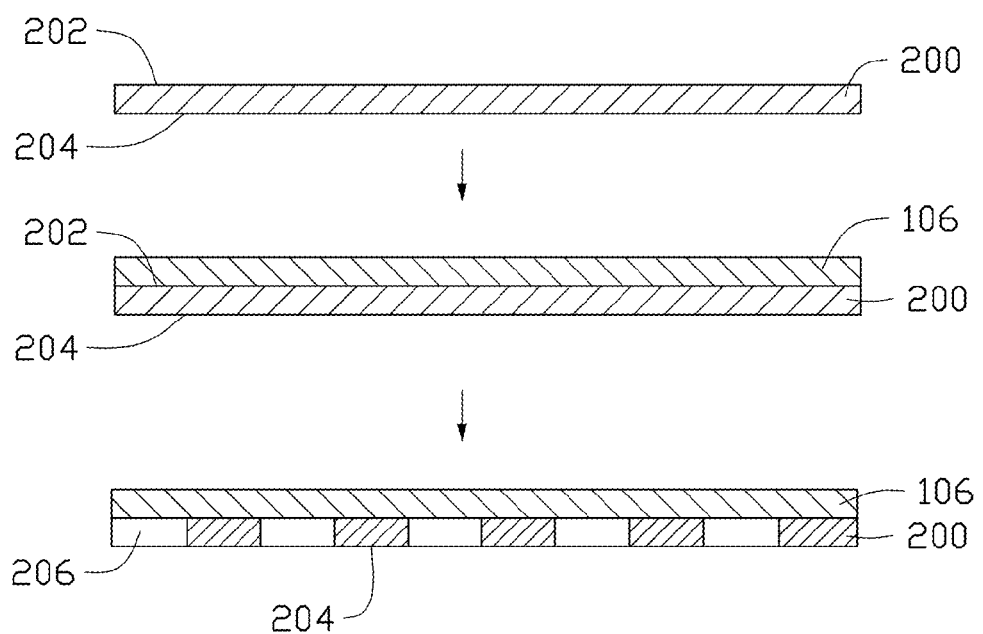
FIG. 13 shows a flowchart of another embodiment of a method for making a thermoacoustic element at various stages.

Referring to FIG. 13, another embodiment of a method for making the thermoacoustic element includes:

S1", arranging the graphene film 106 on the nonmetal substrate 200; and

S2", forming the plurality of through-holes 206 in the nonmetal substrate 200, wherein the graphene film 106 is exposed through the plurality of through-holes 206.

The step S2" is the same as the above step S4'. In the step S1", the graphene film 106 can be directly formed on the nonmetal substrate 200. The graphene film 106 can be made by mechanical pressure method, LB method, solution method, or tearing from oriented graphite using a tape.

In one embodiment, the graphene film 106 is made by the mechanical pressure method. The mechanical pressure method includes:

S21", forming an oxide layer on the first surface 202 of the nonmetal substrate 200 using plasma;

S22", disposing a highly oriented pyrolytic graphite (HOPG) having a cleavaged surface, on the oxide layer of the first surface 202 of the nonmetal substrate 200, wherein the cleavage surface is in contact with the oxide layer;

S23", applying a pressure on the HOPG disposed on the nonmetal substrate 200; and S24", removing the HOPG from the nonmetal substrate 200, thereby forming the graphene film 106 on the oxide layer of the nonmetal substrate 200.

In step S23", before applying the pressure on the HOPG, the HOPG and the nonmetal substrate 200 can be closely clipped in a clamp to be pressed. The pressure can be applied on the clamp. The pressure can be in a range from about 98 Pa to about 196 Pa. The pressure can be applied for about 5 minutes to about 10 minutes. The method for making the graphene film 106 is carried out in a sterilized room. In one embodiment, the graphene film 106 formed by the mechanical pressure method includes a single graphene layer.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a thermoacoustic element, the method comprising:
arranging a graphene film on a metal substrate;
forming a laminate structure by stacking a nonmetal substrate on the metal substrate, wherein the graphene film is sandwiched between the nonmetal substrate and the metal substrate;

removing the metal substrate from the laminate structure; and forming a plurality of through-holes in the nonmetal substrate after forming the laminate structure, wherein the graphene film is exposed through the plurality of through-holes.

2. The method of claim 1, wherein a thickness of the nonmetal substrate is in a range from about 12.5 μm to about 50 μm.

3. The method of claim 1, further comprising a step of fixing the nonmetal substrate and the graphene film together.

4. The method of claim 3, wherein the fixing step comprises: disposing a macromolecule solution or a molten macromolecule between the graphene film and the nonmetal substrate; and solidifying the macromolecule solution or the molten macromolecule to form a macromolecule material layer, wherein the graphene film and the nonmetal substrate are fixed together by the macromolecule material layer.

5. The method of claim 4, wherein the macromolecule solution or the molten macromolecule has a viscosity larger than 1 Pa·s.

6. The method of claim 4, wherein the macromolecule solution or the molten macromolecule comprises a macromolecule material selected from the group consisting of phenolic resin, polystyrene, ethoxyline resin, polyurethane, polymethyl methacrylate, polycarbonate, polyethylene terephthalate, polyalkenamer, and any combination thereof.

7. The method of claim 3, wherein the nonmetal substrate and the graphene film are fixed together by hot pressing technology or cold pressing technology.

8. The method of claim 7, wherein a hot pressing temperature in the hot pressing technology is in a range from about 110° C. to about 120° C.

9. The method of claim 3, wherein the fixing step comprises: infiltrating an organic solvent into the stacked structure; and removing the organic solvent.

10. The method of claim 1, wherein the metal substrate is completely removed by etching.

11. The method of claim 1, further comprising a step of combining a carbon nanotube layer with the graphene film.

12. The method of claim 11, wherein the carbon nanotube layer comprises at least one drawn carbon nanotube film, at least one flocculated carbon nanotube film, at least one pressed carbon nanotube film, or any combination thereof.

13. The method of claim 1, further comprising a step of disposing at least two electrodes on the graphene film, wherein the at least two electrodes are spaced from each other and electrically connected with the graphene film.

14. The method of claim 1, wherein the plurality of through-holes are formed by etching.

15. The method of claim 14, wherein a distance between the adjacent through-holes is in a range from about 100 μm to about 3 mm.

16. A method for making a thermoacoustic element, the method comprising:

arranging a graphene film on a metal substrate;

forming a laminate structure by stacking a nonmetal substrate on the metal substrate, wherein the graphene film is sandwiched between the nonmetal substrate and the metal substrate;

partially removing the metal substrate from the laminate structure; and forming a plurality of through-holes in the nonmetal substrate after forming the laminate structure, wherein the graphene film is exposed through the plurality of through-holes.

17. The method of claim 16, wherein the step of partially removing the metal substrate comprises:

forming a sacrifice layer on a surface of the metal substrate, wherein the sacrifice layer consists of a plurality of spaced sacrifice strips to expose a part of the metal substrate;

etching the part of the metal substrate exposed from the sacrifice layer, thereby forming a plurality of stripped electrodes spaced from each other; and removing the sacrifice layer.

18. The method of claim 17, wherein a material of the sacrifice layer is selected from the group consisting of polymethyl methacrylate, ethoxyline resin, unsaturated polyester, silicon ether resin, and any combination thereof.

19. A method for making a thermoacoustic element, the method comprising:

arranging a graphene film on a nonmetal substrate; and forming a plurality of through-holes in the nonmetal substrate after arranging the graphene film on the nonmetal substrate, wherein the graphene film is exposed through the plurality of through-holes.

20. The method of claim 19, wherein the graphene film is made by a mechanical pressure method, the mechanical pressure method comprising:

forming an oxide layer on a surface of the nonmetal substrate using plasma;

disposing a highly oriented pyrolytic graphite having a cleavage surface on the oxide layer of the nonmetal substrate, wherein the cleavage surface is in contact with the oxide layer;

applying a pressure on the highly oriented pyrolytic graphite disposed on the nonmetal substrate; and removing the highly oriented pyrolytic graphite from the nonmetal substrate, thereby forming the graphene film on the oxide layer of the nonmetal substrate.

* * * * *